Patented June 10, 1930

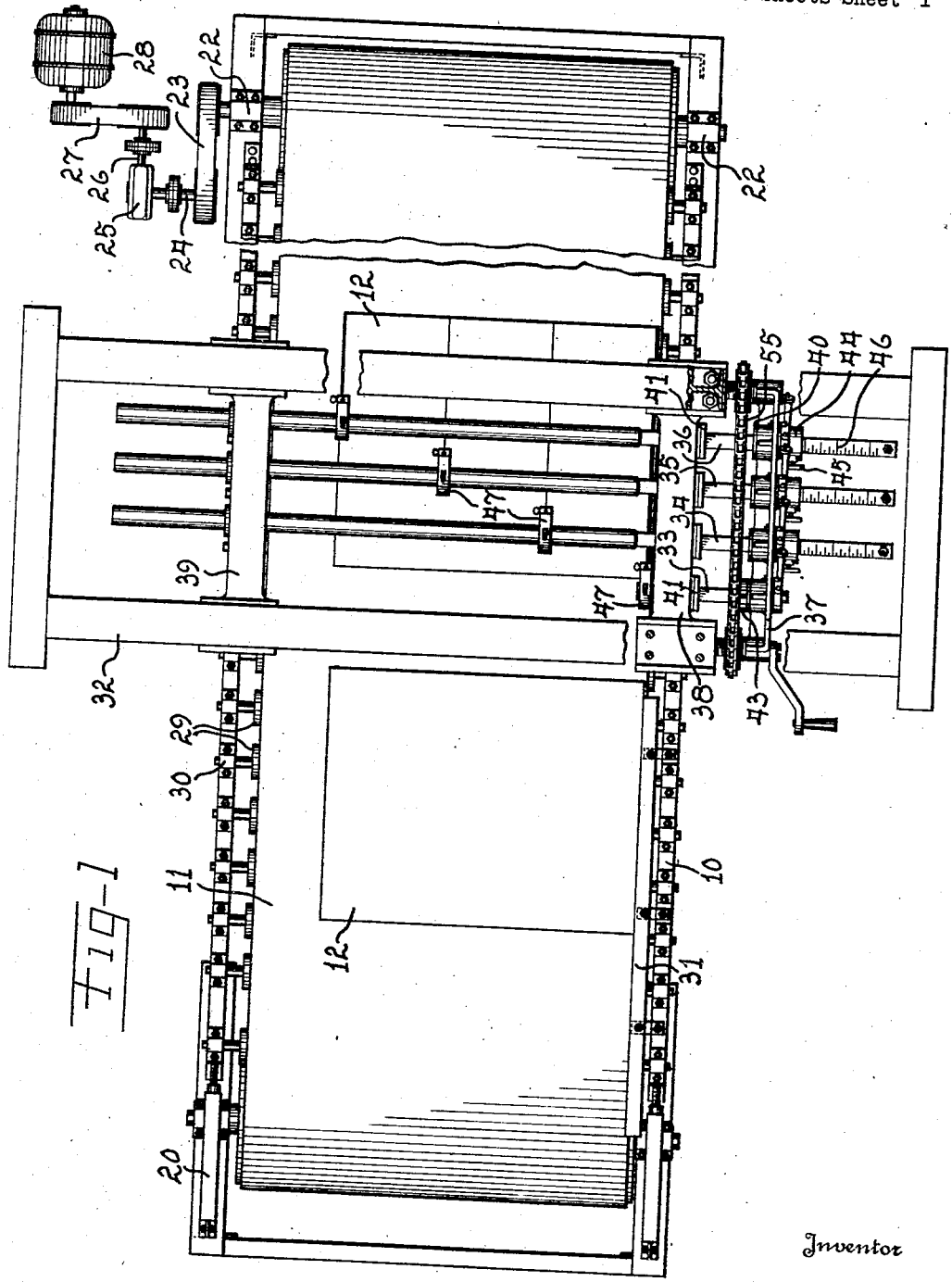

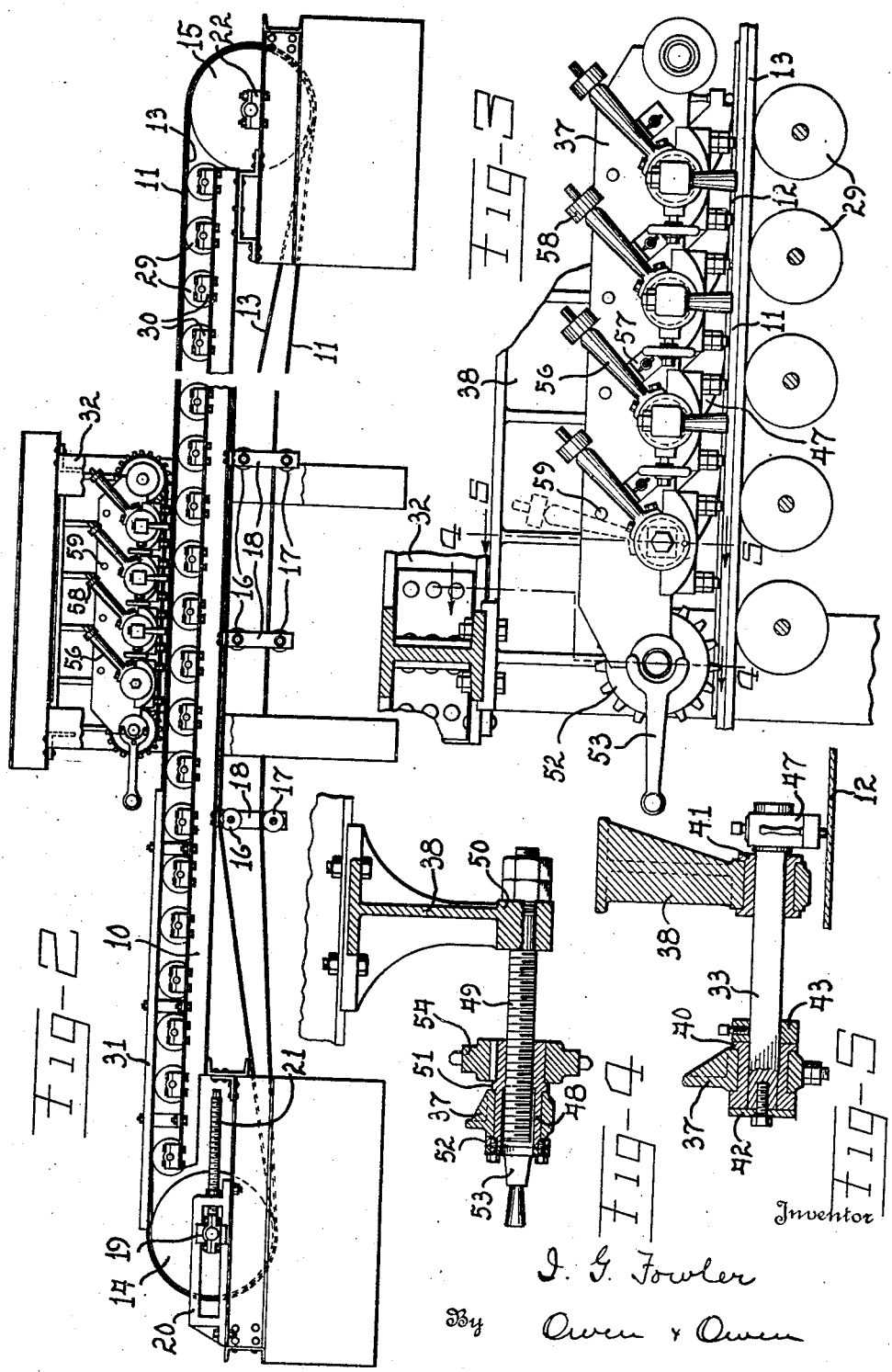

1,762,575

UNITED STATES PATENT OFFICE

IVAL G. FOWLER, OF TOLEDO, OHIO, ASSIGNOR TO THE EDWARD FORD PLATE GLASS COMPANY, OF ROSSFORD, OHIO, A CORPORATION OF OHIO

GLASS-CUTTING DEVICE

Application filed July 20, 1927. Serial No. 207,159.

This invention relates to a glass cutting device, with special reference to the cutting of plate glass, after it is inspected, in accordance with the marking thereon, so that each plate may be used to the best advantage after giving due consideration to its quality and its defects.

The traveling table, above which the cutters are mounted, will preferably be located alongside the carrier which conveys the plates past the inspectors, and the device is so arranged that the plates, after they have been examined and marked, may be conveniently transferred to the table, fed beneath the cutters, and then returned to the carrier, to be conveyed to the place where they are sorted and packed.

The object of the present invention is to provide a traveling table and one or more cutters associated therewith and arranged in such a manner that the successive plates may be handled expeditiously and cut economically as indicated by the inspector. The surface of the traveling table comprises an endless band of felt or similar material overlying the driving belt and supported by rollers at frequent intervals to maintain an even surface. Above one side of the table there is provided a gage or stop, against which one edge of the glass is placed. One or more cutters may be provided, each being mounted upon a transverse shaft above the table and beyond the gage, and arranged so that it may be easily and quickly adjusted laterally of the table. If more than one cutter is provided, they are arranged so that any one may be adjusted independently or all may be adjusted simultaneously as a unit.

The detailed construction of the invention, together with its objects and advantages, will be more particularly explained in connection with the accompanying drawings, which illustrate one embodiment thereof.

In the drawings:

Figure 1 is a plan view of the invention with parts thereof broken away.

Fig. 2 is a side elevation thereof with parts broken away.

Fig. 3 is a side elevation of the cutting elements on an enlarged scale, adjacent parts of the supporting structure being shown in section.

Fig. 4 is a detail sectional view of the means for adjusting the gang of cutters as a unit.

Fig. 5 is a detail sectional view of one of the cutting elements and the mounting therefor.

The cutting device, to which the invention relates, is supported by a rectangular frame 10 which is constructed with longitudinal and transverse rails suitable for the purpose. The traveling table comprises a band 11 of felt or similar material on which the glass plates 12 are laid. Inside of the band 11 is a traveling belt 13 which passes about pulleys or rollers 14 and 15 mounted at opposite ends of the frame 10. The lower lap of the belt 13 passes over idler rolls 16 and the lower lap of the band 11 passes over idler rolls 17, the rolls 16 and 17 being supported in depending brackets 18 secured to the frame 10.

One of the driving rollers or pulleys, as 14, is mounted in bearing boxes 19 which are adjustable longitudinally in brackets 20, by means of screws 21 or the like, to secure the proper tension on the belt 13. One of the rollers, as 15, to which the driving mechanism is connected, is mounted in bearing boxes 22; and is driven by any suitable means. The driving mechanism shown in Fig. 1 comprises a belt 23 driven from a countershaft 24 which is connected through a gear box 25 to a driving shaft 26. The shaft 26 is driven by a belt 27 from a motor 28.

The traveling table or band 11 is supported by rollers 29 journaled in boxes 30 at the sides of the frame. These rollers 29 are arranged quite closely to each other so that the table will present an even surface to the plates and avoid any undue strain thereon. A longitudinal gage bar or stop 31 is secured above one side of the table to constitute a guide against which one edge of the plate is placed, as it is fed through the cutters.

A cutter supporting frame 32 is secured transversely of the intermediate portion of the frame 10 and above the table 11. In the present embodiment of the invention there are provided a short cutter shaft 33 and long cutter shaft 34, 35 and 36. These cutter shafts are supported in an adjusting plate 37 and a bearing plate 38, and the long shafts 34, 35 and 36 are further supported at the other side of the table in a bearing plate 39.

As shown in Fig. 5, the short cutter shaft 33 is supported in the plates 37 and 38 by means of bushings 40 and 41 respectively and the long shafts 34, 35 and 36 are supported by similar bushings. The shaft 33 is secured against longitudinal movement by a cap 42 secured to the end thereof and a collar 43 secured to the shaft at the inner end of the bushing 40.

To permit the longitudinal adjustment of the longer shafts 34, 35 and 36, the bushing 40 for each of them is provided with a hub 44 having a set screw or other securing device 45 whereby the shaft may be moved longitudinally to the desired position and there secured. Each of these longer shafts may conveniently be marked with a measuring scale 46 to determine the desired adjustment. Each cutter shaft carries a cutting element 47 which may be secured to the shaft at any desired point.

The adjusting plate 37 is mounted at each end on a sleeve 48, as shown in Fig. 4. This sleeve is threaded on a spindle 49 which is secured at its inner end in a depending portion 50 of the bearing plate 38. The sleeve 48 is rotatable in the plate 37 but is held against axial movement with respect to the plate by shoulders 51 and 52. As the sleeve 48 is rotated, therefore, it advances or recedes along the spindle 49 and carries the plate 37 with it. One of the sleeves 48 has a crank handle 53 secured thereto, by means of which it may be rotated. Each sleeve 48 has an inward extension to which a sprocket wheel 54 is secured and the two sprocket wheels are connected by a sprocket chain 55 so that the two sleeves 48 will always rotate in synchronism and both ends of the adjusting plate 37 will be moved equally and simultaneously. By means of the crank handle 53, therefore, all of the cutters 47 may be adjusted as a gang without changing the relative distances between the individual cutters.

Each cutter shaft may be rocked to move its cutter into or out of engagement with the glass, by means of a handle 56 secured to the bushing 40. The portion of each shaft which fits the bushing 40 is square in cross section, or at least non-circular, so that it may be readily shifted in the direction of its length, but cannot rock except when the bushing rocks. When the cutter is in operative position the handle 56 will rest against an abutment 57 which is adjustably secured to the adjusting plate 37. A weight 58 may be mounted on the end of the handle 56 to secure the proper pressure of the cutter against the glass. A suitable catch 59 may be provided for engaging the handle 56 to retain the same when it is desired to leave the cutter in inoperative position.

From the foregoing description it will be understood that any desired number of cutting elements may be mounted in the manner indicated and that they may be readily adjusted crosswise of the table, either individually or collectively. Means are provided for properly measuring the positions of the several cutters and the device is so arranged that the successive plates may be removed from the carriers as fast as they are cleaned and inspected and may forthwith be fed through the cutting device. This may be done notwithstanding the fact that it may be necessary to make different adjustments for each plate. As fast as the plates are delivered from the cutting table they may be replaced upon the carrier to continue their course to the place where they are sorted and packed.

While the various mechanisms employed in carrying out the invention have been shown and described in considerable detail, it is to be understood that this has been done only for the purpose of illustration, and that the structure of the same may be considerably modified without any material departure from the scope of the invention as claimed.

What I claim is:

1. In a sheet glass cutting device, the combination of a carrier frame beneath which the glass travels, shafts mounted in said frame and extending across the glass, cutting elements secured to the shaft respectively, individual means provided with a measuring scale for adjusting said shafts individually in the direction of their length to bring the cutting elements the required distance apart, and additional means for effecting a simultaneous and equal adjustment of all the shafts in the direction of their length.

2. In a glass cutting device, the combination of a cutter shaft beneath which the glass travels transversely of the shaft, spaced bushings in which the shaft is mounted, supporting members in which the bushings are mounted for rocking movement but held against axial movement, a cutting element secured to the shaft between said bushings and means secured to one of the bushings for rocking the same and thereby rocking the shaft to move the cutter into or out of engagement with the glass, said shaft being adjustable in the direction of its length but non-rotatable with respect to said last mentioned bushing, whereby to adjust the cutting element laterally of the glass.

3. In a glass cutting device, the combination of a vertical bearing plate, cutter shafts mounted in said bearing plate perpendicularly thereto and adjustable in the direction of their length, cutting elements carried by the respective shafts and parallel to said plate, an adjusting plate in which said shafts are also slidably mounted, means to prevent endwise movement of said shafts with respect to the adjusting plate, and means for bodily moving said adjusting plate laterally to adjust the cutting elements laterally as a gang without changing the distance between the respective elements.

4. In a glass cutting device, the combination of a vertical bearing plate, cutter shafts mounted in said bearing plate perpendicular thereto and adjustable in the direction of their length, cutting elements carried by the respective shafts and parallel to said plate, an adjusting plate in which said shafts are also slidably mounted, certain of said shafts being individually and selectively adjustable endwise in said adjusting plate, and means for moving said adjusting plate toward or away from said bearing plate and thereby adjusting all of said shafts and cutters simultaneously as a gang.

5. In a glass cutting device, the combination of a vertical bearing plate, cutter shafts mounted in said bearing plate perpendicular thereto and adjustable in the direction of their length, cutting elements carried by the respective shafts and parallel to said plate, an adjusting plate in which said shafts are also slidably mounted, means to prevent endwise movement of said shafts with respect to the adjusting plate, means for bodily moving said adjusting plate laterally to adjust the cutting elements as a gang without changing the distance between the respective elements, and means individual to each shaft for rocking the same to move its cutter into or out of contact with a sheet of glass supported therebeneath.

6. In a glass cutting device, a plurality of parallel cutter shafts beneath which the glass travels transversely thereto, cutting elements carried by said shafts, a plate through which the shafts project, a sleeve rotatably mounted in each end of said plate, spindles on which the respective sleeves are threaded, said spindles being substantially parallel to said shafts, a frame in which said spindles are secured, means for directly rotating one of the sleeves, means operatively connecting the sleeves to cause them to rotate equally for bodily moving all parts of said plate equally, and means connecting said shafts with said plate so that they will move therewith to adjust the cutting elements as a gang lengthwise of the spindles.

7. In a glass cutting device, a bearing plate, a pair of parallel threaded spindles secured to said bearing plate, a pair of sleeves mounted on the respective spindles, gearing connecting the sleeves, an adjusting plate in which said sleeves are rotatably mounted so as to support said plate and move it transversely when the sleeves are rotated, cutting means movable with said adjusting plate, and means for directly rotating one of the sleeves and thereby rotating the other a like amount to adjust the cutting means as a unit lengthwise of the spindles.

8. In a glass cutting device, a bearing plate, a pair of threaded spindles secured transversely to said plate, a pair of sleeves mounted on the respective spindles, gearing connecting the sleeves, an adjusting plate in which said sleeves are rotatably mounted so as to support said plate and move it longitudinally of the spindles as the sleeves are rotated, a plurality of spaced cutting elements movable with said adjusting plate, certain of said cutting elements being individually adjustable laterally of the adjusting plate to vary the distance between them, and means for directly rotating one of said sleeves and thereby rotating the other a like amount to adjust all of the cutting elements together as a gang lengthwise of the spindles.

9. In a sheet glass cutting device, the combination of a plurality of cutting elements beneath which the glass travels, means connecting and supporting said cutting elements in a gang, and means for adjusting said gang bodily across the face of the glass, certain of said cutting elements being also individually adjustable with relation to the other elements in the gang, across the face of the glass.

In testimony whereof I have hereunto signed my name to this specification.

IVAL G. FOWLER.